(12) United States Patent
Saitoh et al.

(10) Patent No.: US 9,335,590 B2
(45) Date of Patent: May 10, 2016

(54) LIQUID CRYSTAL DISPLAY ELEMENT AND LIQUID CRYSTAL DISPLAY DEVICE

(71) Applicant: Sharp Kabushiki Kaisha, Osaka-shi, Osaka (JP)

(72) Inventors: Kaori Saitoh, Osaka (JP); Yoshimizu Moriya, Osaka (JP); Yuki Kawashima, Osaka (JP); Noboru Nakanishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 154 days.

(21) Appl. No.: 14/349,782

(22) PCT Filed: Oct. 22, 2012

(86) PCT No.: PCT/JP2012/077248
§ 371 (c)(1),
(2) Date: Apr. 4, 2014

(87) PCT Pub. No.: WO2013/061929
PCT Pub. Date: May 2, 2013

(65) Prior Publication Data
US 2014/0307214 A1     Oct. 16, 2014

(30) Foreign Application Priority Data
Oct. 27, 2011   (JP) ................................ 2011-236526

(51) Int. Cl.
*G02F 1/1343*   (2006.01)

(52) U.S. Cl.
CPC .... *G02F 1/134309* (2013.01); *G02F 1/134363* (2013.01)

(58) Field of Classification Search
CPC ................................................. G02F 1/134309
See application file for complete search history.

(56) References Cited

U.S. PATENT DOCUMENTS

| 7,623,194 B2 * | 11/2009 | Lin ................... G02F 1/136286 349/139 |
| 2006/0278873 A1 | 12/2006 | Ishii |
| 2008/0204648 A1 | 8/2008 | Tanaka et al. |

FOREIGN PATENT DOCUMENTS

| JP | 2006-343612 A | 12/2006 |
| JP | 2008-209686 A | 9/2008 |

OTHER PUBLICATIONS

Official Communication issued in International Patent Application No. PCT/JP2012/077248, mailed on Jan. 15, 2013.

\* cited by examiner

*Primary Examiner* — Timothy L Rude
(74) *Attorney, Agent, or Firm* — Keating & Bennett, LLP

(57) ABSTRACT

A liquid crystal display element (10) of the present invention includes a transparent common electrode (40) which is provided in a layer between (i) a scan line (20) and a signal line (19) and (ii) a pixel electrode (30) so that the transparent common electrode (40) covers a location which faces at least one of (i) at least part of the scan line (20) and (ii) at least part of the signal line (19), the transparent common electrode (40) having an opening part (41) at a location which faces the pixel electrode (30).

5 Claims, 8 Drawing Sheets 200, 200, 200, 200, 200, 200, 200, 200, 200, 200, 200, 200, 200, 200, 200, 200, 200, 200, 200, 200, 200, 200, 200, 200
LIQUID CRYSTAL DISPLAY ELEMENT AND LIQUID CRYSTAL DISPLAY DEVICE

TECHNICAL FIELD

The present invention relates to a liquid crystal display element and a liquid crystal display device. The present invention particularly relates to a liquid crystal display element and a liquid crystal display device which are of a vertical electric field type typified by a TN mode and a VA mode.

BACKGROUND ART

Recently, not a few devices, such as a television and a mobile phone, have been provided with a liquid crystal display device. The liquid crystal display device is a display device including a liquid crystal display element which controls orientation of liquid crystal by controlling an electric field which is generated between electrodes, thereby controlling light transmittance of the liquid crystal display element. There are various methods of controlling the orientation of liquid crystal. The methods can be classified into a vertical electric field type and a lateral electric field type, from the viewpoint of a direction in which an electric field is generated.

A vertical electric field type liquid crystal display element includes (i) a pair of transparent substrates which are provided so as to face each other, and (ii) a liquid crystal layer which is sandwiched between the pair of transparent substrates. One of the pair of transparent substrates is provided with pixel electrodes. The other of the pair of transparent substrates is provided with a counter electrode. By applying a voltage across a pixel electrode and the counter electrode, an electric field perpendicular to the liquid crystal layer, in other words, a vertical electric field is generated in the liquid crystal layer. By controlling of an intensity and a direction of the vertical electric field, orientation of liquid crystal is restricted. Examples of a typical vertical electric field type liquid crystal display element include a TN (twisted nematic) mode liquid crystal display element and a VA (vertical alignment) mode liquid crystal display element.

FIGS. 5 and 6 schematically illustrate a liquid crystal display element 100 as an example of the vertical electric field type liquid crystal display element. (a) of FIG. 5 is a plan view illustrating the liquid crystal display element 100. (b) of FIG. 5 is a cross-sectional view taken along Line A-A illustrated in (a) of FIG. 5. (a) of FIG. 6 is an enlarged view illustrating part of the cross-sectional view illustrated in (b) of FIG. 5. (b) of FIG. 6 is an enlarged cross-sectional view taken along a scan line 120 which is parallel to the Line A-A illustrated in (a) of FIG. 5.

As illustrated in (b) of FIG. 5, the liquid crystal display element 100 includes (i) a pair of transparent substrates, i.e., a glass substrate 111 and a glass substrate 112, and (ii) a liquid crystal layer 113 which is sandwiched between the glass substrate 111 and the glass substrate 112. As illustrated in (a) of FIG. 5, the glass substrate 111 is provided with a plurality of signal lines 119, a plurality of scan lines 120, a plurality of TFTs (Thin Film Transistors), a plurality of pixel electrodes 130, and a plurality of common electrodes 140.

The plurality of signal lines 119 are arranged at regular intervals so as to be parallel to each other. Similarly, the plurality of scan lines 120 are arranged at regular intervals so as to be parallel to each other. The plurality of signal lines 119 are orthogonal to the plurality of scan lines 120. This causes rectangular regions, which are defined by the plurality of signal lines 119 and the plurality of scan lines 120, to be arranged in a matrix manner on a surface of the glass substrate 111. The rectangular regions correspond to respective sub-pixels. Three sub-pixels (a red sub-pixel, a green sub-pixel, and a blue sub-pixel) constitute one (1) pixel.

Two TFTs are provided for each sub-pixel. The two TFTs are a top gate coplanar TFT, and are provided with (i) gate electrodes 123, an SI electrically-conductive path 121, and an SI electrically-conductive path 122. The gate electrodes 123 of the TFT are part of a scan line 120 corresponding to the TFT. A source electrode (not illustrated) is provided at an end of the SI electrically-conductive path 121. The source electrode is connected to a signal line 119 via a contact hole (not illustrated). The SI electrically-conductive path 122 is connected to a drain electrode 124. The drain electrode 124 is connected to a pixel electrode 130 via a contact hole (not illustrated).

While one of the plurality of scan lines 120 is being selected, an address signal is supplied to the one of the plurality of scan lines 120, and the plurality of signal lines 119 sequentially receive a data signal. This causes a voltage to be supplied to the SI electrically-conductive path 122 and the pixel electrode 130 in accordance with the data signal. This consequently causes an electric field to be generated between the pixel electrode 130 and a counter electrode 125 in accordance with the data signal.

Even while none of the plurality of scan lines is being selected, the liquid crystal display element 100 should hold an electric field which is between the pixel electrode 130 and the counter electrode 125. The liquid crystal display element 100 includes the plurality of common electrodes 140 so that storage capacitance for holding the electric filed is generated. The plurality of common electrodes 140 are provided in a layer in which the plurality of scan lines 120 are provided. The plurality of common electrodes 140 are made of an opaque electrically-conductive metallic material which is identical to that of which the plurality of scan lines 120 are made. The plurality of common electrodes 140 are arranged in parallel to the plurality of scan lines 120. Each of the plurality of common electrodes 140 is provided between corresponding two adjacent scan lines 120 of the plurality of scan lines 120.

Similar to a vertical electric field type liquid crystal display element, a lateral electric field type liquid crystal display element includes a liquid crystal layer which is sandwiched between a pair of transparent substrates. However, the lateral electric field type liquid crystal display element is different from the vertical electric field type liquid crystal display element in that one of a pair of transparent substrates is provided with pixel electrodes and a common electrode. According to the lateral electric field type liquid crystal display element, an electric field is generated in an in-plane direction of the liquid crystal layer, in other words, a lateral electric field is generated, by applying a voltage across the pixel electrodes and the common electrode. Examples of the lateral electric field type liquid crystal display element include an IPS (in-plane switching) mode liquid crystal display element and an FFS (fringe field switching) mode liquid crystal display element.

Patent Literature 1 describes an FFS mode liquid crystal display element in which an influence of parasitic capacitance is reduced. A characteristic of this invention will be described below with reference to FIGS. 7 and 8.

FIG. 7 is a view schematically illustrating an FFS mode liquid crystal display element 200. (a) of FIG. 7 is a plan view illustrating the FFS mode liquid crystal display element 200. (b) of FIG. 7 is a cross-sectional view taken along Line A-A illustrated in (a) of FIG. 7. FIG. 8 is an enlarged view illustrating part of the cross-sectional view illustrated in (b) of FIG. 7.

As illustrated in (b) of FIG. 7, the FFS mode liquid crystal display element 200 includes (i) a pair of transparent substrates, i.e., a glass substrate 211 and a glass substrate 212, and (ii) a liquid crystal layer 213 which is sandwiched between the glass substrate 211 and the glass substrate 212. As illustrated in (a) of FIG. 7, the glass substrate 211 is provided with a plurality of signal lines 219, a plurality of scan lines 220, a plurality of TFTs, a plurality of pixel electrodes 230, and a common electrode 240. The common electrode 240 is made of an electrically-conductive material which is transparent to visible light.

The plurality of signal lines 219 are arranged at regular intervals so as to be parallel to each other. Similarly, the plurality of scan lines 220 are arranged at regular intervals so as to be parallel to each other. The plurality of signal lines 219 are orthogonal to the plurality of scan lines 220, whereby rectangular regions, which are defined by the plurality of signal lines 219 and the plurality of scan lines 220, are arranged in a matrix manner on a surface of the glass substrate 211. The rectangular regions correspond to respective sub-pixels. Three sub-pixels (a red sub-pixel, a green sub-pixel, and a blue sub-pixel) constitute one (1) pixel.

Two TFTs are provided for each sub-pixel. The two TFTs are a top gate coplanar TFT, and are provided with gate electrodes 223, an SI electrically-conductive path 221, and an SI electrically-conductive path 222. The gate electrodes 223 of the TFT are part of a scan line 220 corresponding to the TFT. The SI electrically-conductive path 221 is connected to a source electrode and a signal line 219 via a contact hole (not illustrated). The SI electrically-conductive path 222 is connected to a drain electrode 224. The drain electrode 224 is connected to a pixel electrode 230 via a contact hole (not illustrated). The pixel electrode 230 has slits so that an electric field is generated between the pixel electrode 230 and the common electrode 240 (later described).

CITATION LIST

Patent Literature

Patent Literature 1
Japanese Patent Application Publication, Tokukai, No. 2008-209686 A (Publication Date: Sep. 11, 2008)

SUMMARY OF INVENTION

Technical Problem

Display quality of the liquid crystal display element 100 having such a configuration is deteriorated due to (i) parasitic capacitance which is formed by the signal lines 119 and the pixel electrodes 130 and (ii) parasitic capacitance which is formed by the scan lines 120 and the pixel electrodes 130. This will be described below with reference to FIG. 6.

(a) of FIG. 6 is an enlarged view illustrating part of the cross-sectional view illustrated in (b) of FIG. 5. (b) of FIG. 6 is an enlarged cross-sectional view taken along a scan line 120 which is parallel to Line A-A in (a) of FIG. 5.

As illustrated in (a) of FIG. 6, only a JAS film 117, which is made of an insulating material, is provided between the plurality of signal lines 119 and the plurality of pixel electrodes 130. This allows parasitic capacitance Csd 127 to be formed by the plurality of signal lines 119 and the plurality of pixel electrodes 130.

As illustrated in (b) of FIG. 6, only the JAS film 117 and an insulating film 116 are provided between the plurality of scan lines 120 and the plurality of pixel electrodes 130. This allows parasitic capacitance Cgd 128 to be formed by the plurality of scan lines 120 and the plurality of pixel electrodes 130.

The parasitic capacitances Csd 127 and Cgd 128 cause flicker and crosstalk between pixels. This ultimately deteriorates the display quality of the liquid crystal display element 100.

Each sub-pixel has liquid crystal capacitance and storage capacitance, in addition to parasitic capacitance Csd 127 and parasitic capacitance Cgd 128. The liquid crystal capacitance is formed by a corresponding pixel electrode 130 and a counter electrode 125. The storage capacitance is formed by a corresponding common electrode 140 and a corresponding SI electrically-conductive path 122. Assume that the sum of the liquid crystal capacitance, the storage capacitance, the parasitic capacitance Csd 127, and the parasitic capacitance Cgd 128 is pixel capacitance. In this case, as a ratio of the parasitic capacitances to the pixel capacitance increases, the parasitic capacitances more affect the display quality of the liquid crystal display element 100. In other words, by increasing the pixel capacitance due to an increase in the storage capacitance, it is possible to decrease the ratio of the parasitic capacitances to the pixel capacitance. This makes it possible to reduce an influence of the parasitic capacitances on the display quality.

In order to increase the storage capacitance in the liquid crystal display element 100, it is necessary to increase a width of the common electrode 140 (a length of the common electrode 140, which length is parallel to a signal line 119). However, since the common electrode 140 is made from an opaque material, such an increase in width of the common electrode 140 causes a reduction in region which transmits backlight. Thus, such an increase in the storage capacitance for the purpose of reducing the influence of the parasitic capacitances causes another problem that a luminance of the liquid crystal display element 100 is reduced.

The liquid crystal display element 200, which is a lateral electric field type liquid crystal display element, includes the common electrode 240 so as to reduce an influence of parasitic capacitance. The liquid crystal display element 200 is characterized in (i) a shape of the common electrode 240 and (ii) a location where the common electrode 240 is provided. When viewed from above (see (a) of FIG. 7), the common electrode 240 extends over the whole region other than (i) the drain electrodes 224 and (ii) contact holes. When viewed cross-sectionally (see (b) of FIG. 7), the common electrode 240 is provided between (i) a layer where the plurality of signal lines 219 are provided and a layer where the plurality of scan lines 220 are provided and (ii) a layer where the plurality of pixel electrodes 230 are provided.

Therefore, the plurality of signal lines 219 and the plurality of scan lines 220 are shielded from the plurality of pixel electrodes 230 by the common electrode 240. This makes it possible to suppress (i) parasitic capacitance Csd which is formed by the plurality of signal lines 219 and the plurality of pixel electrodes 230 and (ii) parasitic capacitance Cgd which is formed by the plurality of scan lines 220 and the plurality of pixel electrodes 230.

Such suppression of the parasitic capacitances Csd and Cgd makes it possible to stabilize a voltage applied to the common electrode 240. It is therefore possible to prevent display quality of the liquid crystal display element 200 from deteriorating.

However, since the common electrode 240 extends over the whole region other than the drain electrodes 224 and the contact holes (see FIG. 8), backlight 229a should inevitably pass through the common electrode 240. Note that the common electrode 240 has an absorbency which depends on (i) an absorption coefficient of a transparent electrically-conductive material of which the common electrode 240 is made and (ii) a thickness of the common electrode 240. Therefore, the common electrode 240 absorbs light of the backlight 229a at the absorbency. Light not absorbed by the common electrode 240 and has passed through the common electrode 240 exits from the common electrode 240 as backlight 229b. Thus, the liquid crystal display element 200 has a problem that such absorption of the backlight 229a by the common electrode 240 causes a reduction in luminance. Note here that absorption of the backlight 229b by the plurality of pixel electrodes 230 is not taken into account in the above explanation.

In addition, the invention described in Patent Literature 1 is made on the premise of the FFS mode liquid crystal display element, but is not applicable to a vertical electric field type liquid crystal display element.

The present invention was made in view of the problems, and an object of the present invention is to provide (i) a vertical electric field type liquid crystal display element which, without sacrificing a luminance of the vertical electric field type liquid crystal display element, can suppress (a) parasitic capacitance which is formed by scan lines and pixel electrodes and (b) parasitic capacitance which is formed by signal lines and the pixel electrodes, and (ii) a liquid crystal display device which includes the vertical electric field type liquid crystal display element.

Solution to Problem

In order to attain the object, a liquid crystal display element of an aspect of the present invention is configured to include: a pair of transparent substrates; and a liquid crystal layer which is provided between the pair of transparent substrates, one of the pair of transparent substrates being provided with: scan lines; signal lines which are orthogonal to the scan lines; driving elements each of which is connected to a corresponding one of the signal lines and a corresponding one of the scan lines; transparent pixel electrodes which are connected to the respective driving elements and are provided in an upper layer that is upper than the scan lines and the signal lines; and a transparent common electrode or transparent common electrodes which is(are) provided in a layer between (i) the scan lines and the signal lines and (ii) the transparent pixel electrodes so as to cover a location which faces at least one of (i) at least part of the scan lines and (ii) at least part of the signal lines, the transparent common electrode having opening parts at locations which face the respective transparent pixel electrodes, the other of the pair of transparent substrates being provided with a counter electrode.

According to the configuration, the liquid crystal display element of the aspect of the present invention is configured so that the transparent common electrode or the transparent common electrodes is(are) provided in the layer between (i) the scan lines and the signal lines and (ii) the transparent pixel electrodes so as to cover at least one of (i) at least part of the scan lines and (ii) at least part of the signal lines. In a case where the liquid crystal display element is configured so that the transparent common electrode or the transparent common electrodes cover(s) the location which faces the at least part of the scan lines, the transparent common electrode or the transparent common electrodes shield(s) the at least part of the scan lines from the transparent pixel electrodes. On the other hand, in a case where the liquid crystal display element is configured so that the transparent common electrode or the transparent common electrodes cover(s) the location which faces the at least part of the signal lines, the transparent common electrode or the transparent common electrodes shield(s) the at least part of the signal lines from the transparent pixel electrodes. This makes it possible to suppress parasitic capacitance which is formed by the transparent pixel electrodes and the at least one of (i) the at least part of the scan lines and (ii) the at least part of the signal lines.

The transparent common electrode has the opening parts at the locations which face the respective transparent pixel electrodes. This causes an increase in light which, without passing through the transparent common electrode, enters the liquid crystal layer. Consequently, a luminance of the liquid crystal display element is improved.

As such, according to the liquid crystal display element of the aspect of the present invention, it is possible to provide a vertical electric field type liquid crystal display element which, without sacrificing a luminance of the vertical electric field type liquid crystal display element, suppresses (i) parasitic capacitance which is formed by scan lines and pixel electrodes and (ii) parasitic capacitance which is formed by signal lines and the pixel electrodes.

It is preferable to configure a liquid crystal display device of an aspect of the present invention to include any one of liquid crystal display elements described above.

According to the configuration, a liquid crystal display device including a vertical electric field type liquid crystal display element can, without sacrificing a luminance of the liquid crystal display device, suppress (i) parasitic capacitance which is formed by scan lines and pixel electrodes and (ii) parasitic capacitance which is formed by signal lines and the pixel electrodes.

For a fuller understanding of the nature and advantages of the invention, reference should be made to the ensuing detailed description taken in conjunction with the accompanying drawings.

Advantageous Effects of Invention

According to the present invention, a vertical electric field type liquid crystal display element can, without sacrificing a luminance of the vertical electric field type liquid crystal display element, suppress (i) parasitic capacitance which is formed by scan lines and pixel electrodes and (ii) parasitic capacitance which is formed by signal lines and the pixel electrodes. Therefore, the vertical electric field type liquid crystal display element and a vertical electric field type liquid crystal display device which includes the vertical electric field type liquid crystal display element can bring about an effect of improving display quality without sacrificing a luminance.

BRIEF DESCRIPTION OF DRAWINGS (a) of FIG. 1 is a plan view schematically illustrating a liquid crystal display element of an embodiment of the present invention. (b) of FIG. 1 is a cross-sectional view schematically illustrating the liquid crystal display element.

(a) of FIG. 2 is a view schematically illustrating a state where a common electrode suppresses parasitic capacitance Csd which is formed by signal lines and pixel electrodes in the liquid crystal display element. (b) of FIG. 2 is a view schematically illustrating a state where the common electrode suppresses parasitic capacitance Cgd which is formed by scan lines and the pixel electrodes. (c) of FIG. 2 is a view schematically illustrating a state where backlight passes through the liquid crystal display element.

Figure 5:
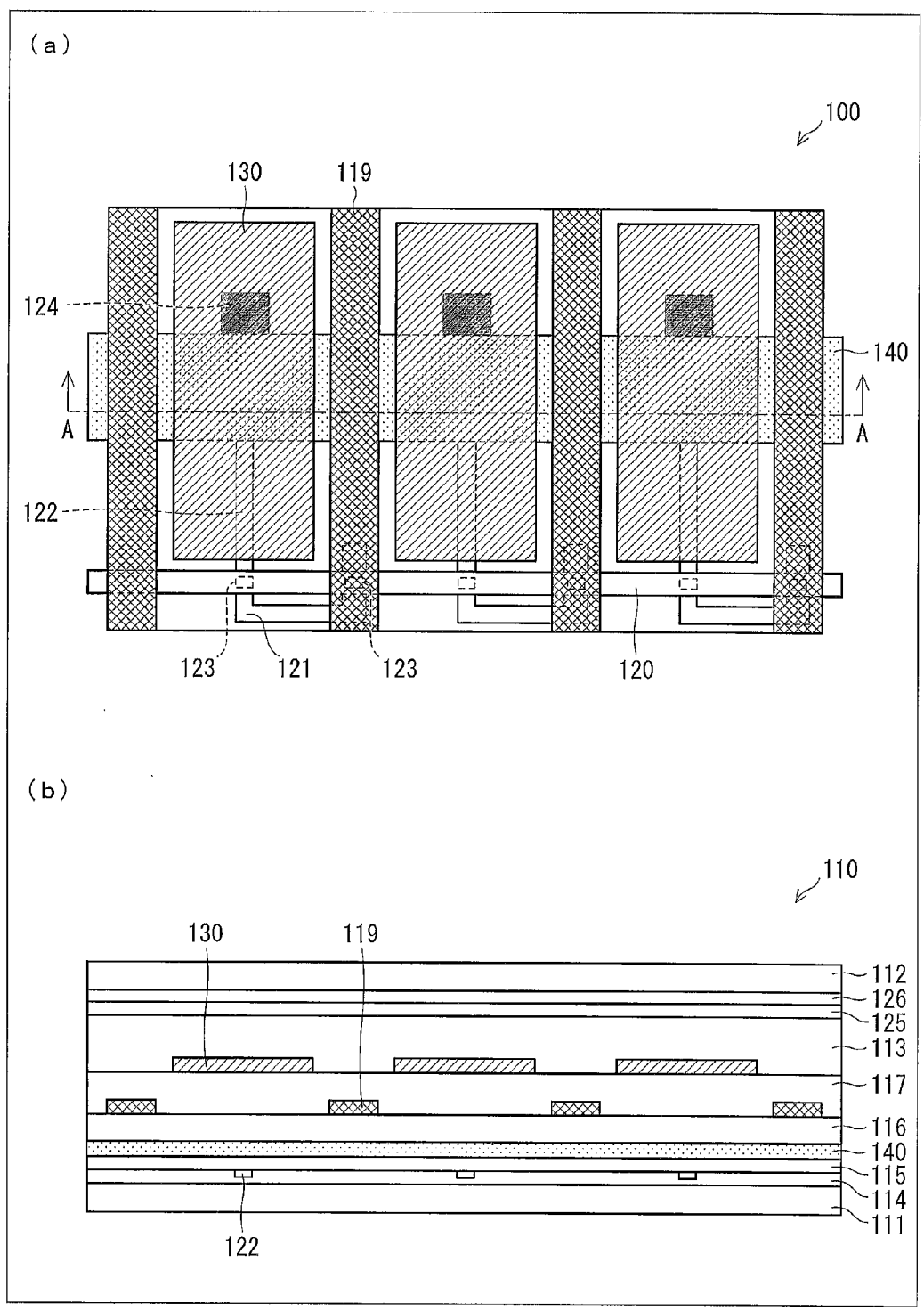

(a) of FIG. 5 is a plan view schematically illustrating a conventional liquid crystal display element. (b) of FIG. 5 is a cross-sectional view schematically illustrating the conventional liquid crystal display element.

Figure 6:
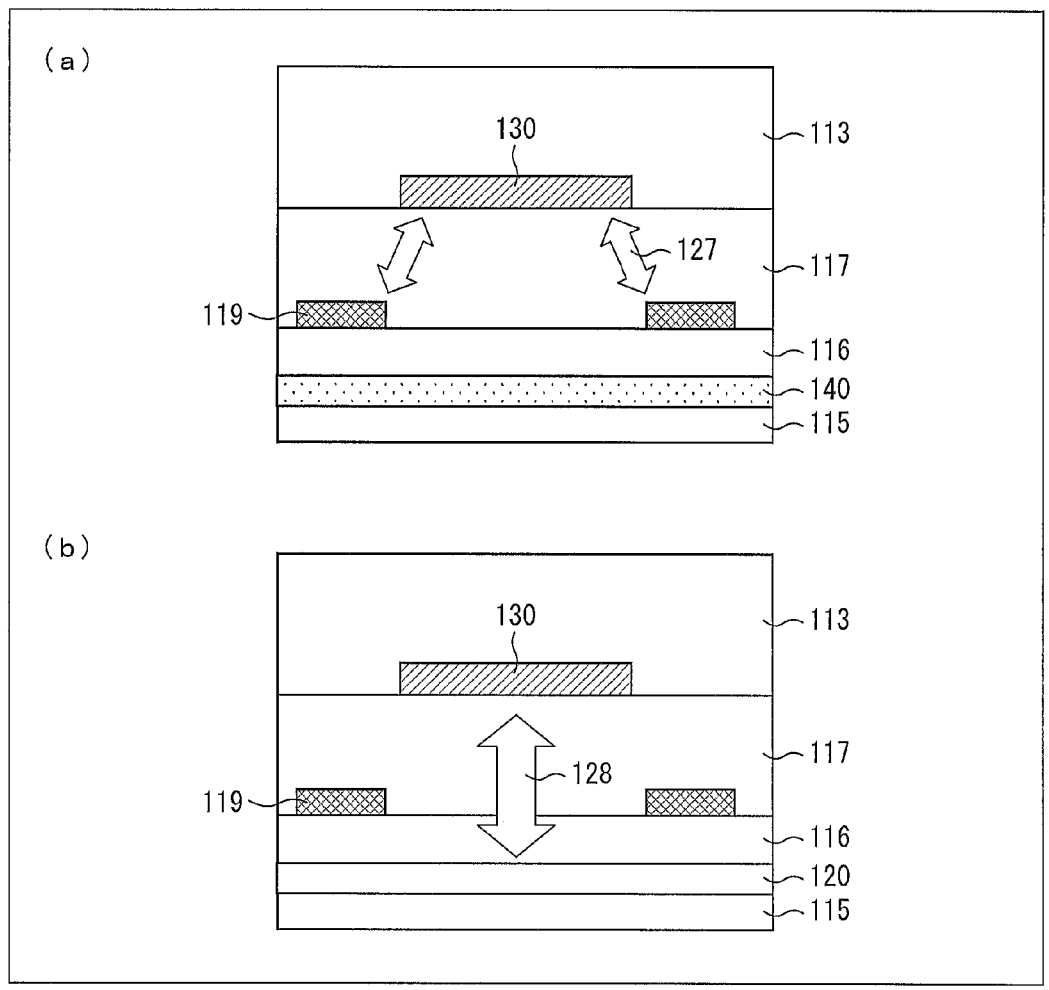

(a) of FIG. 6 is a view schematically illustrating parasitic capacitance Csd which is formed by signal lines and pixel electrodes in the conventional liquid crystal display element. (b) of FIG. 6 is a view schematically illustrating parasitic capacitance Cgd which is formed by scan lines and the pixel electrodes.

Figure 7:
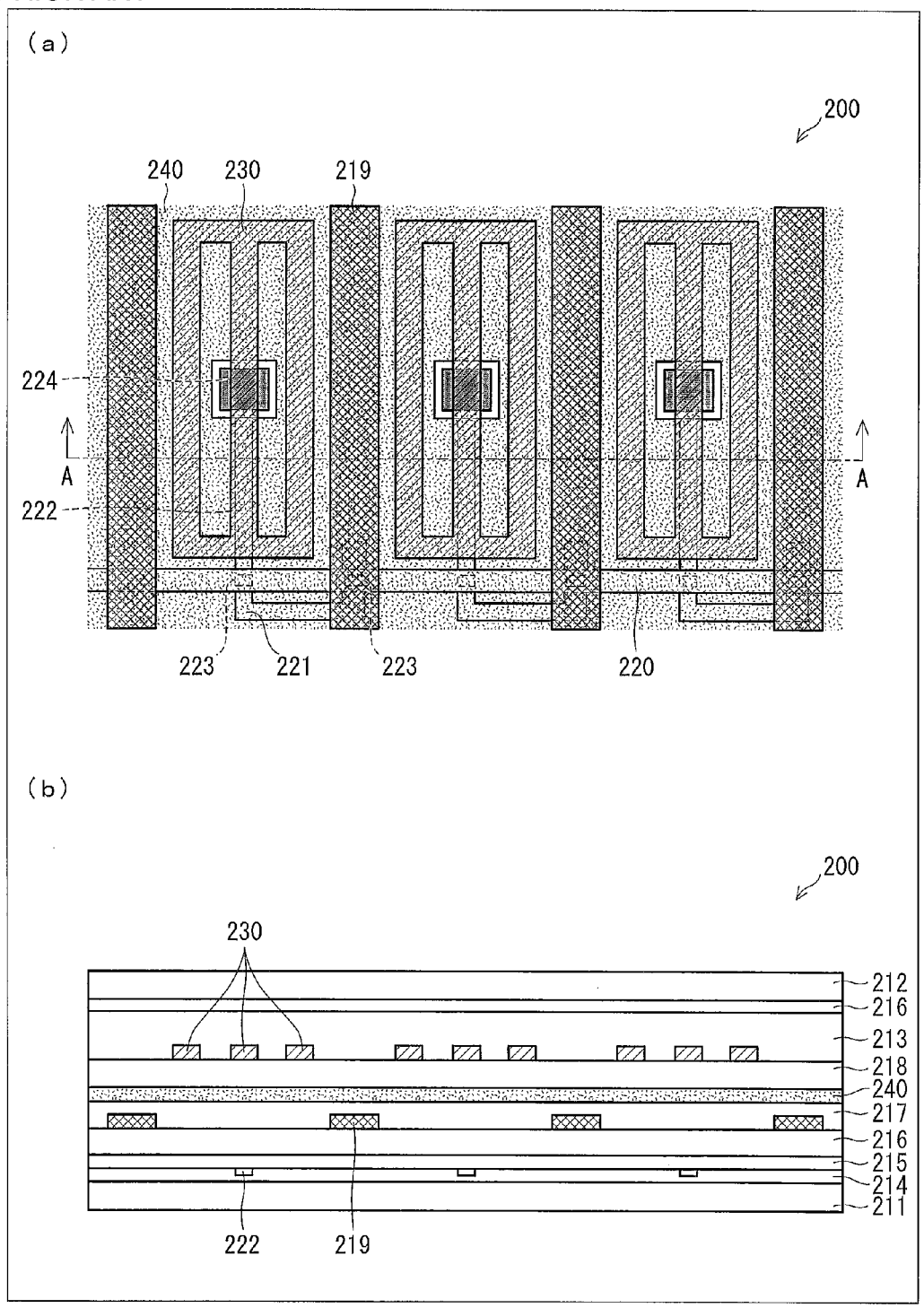

(a) of FIG. 7 is a plan view schematically illustrating another conventional liquid crystal display element. (b) of FIG. 7 is a cross-sectional view schematically illustrating the another conventional liquid crystal display element.

Figure 8:
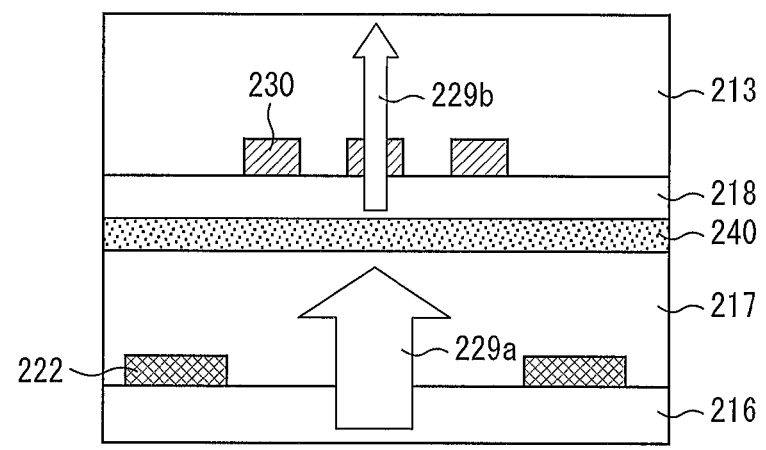

FIG. 8 is a view schematically illustrating a state where backlight passes through the another conventional liquid crystal display element.

DESCRIPTION OF EMBODIMENTS

The following description will discuss in detail Embodiments of the present invention with reference to FIGS. 1 through 4.

Embodiment 1

Schematic Configuration of Liquid Crystal Display Element 10

Figure 1:
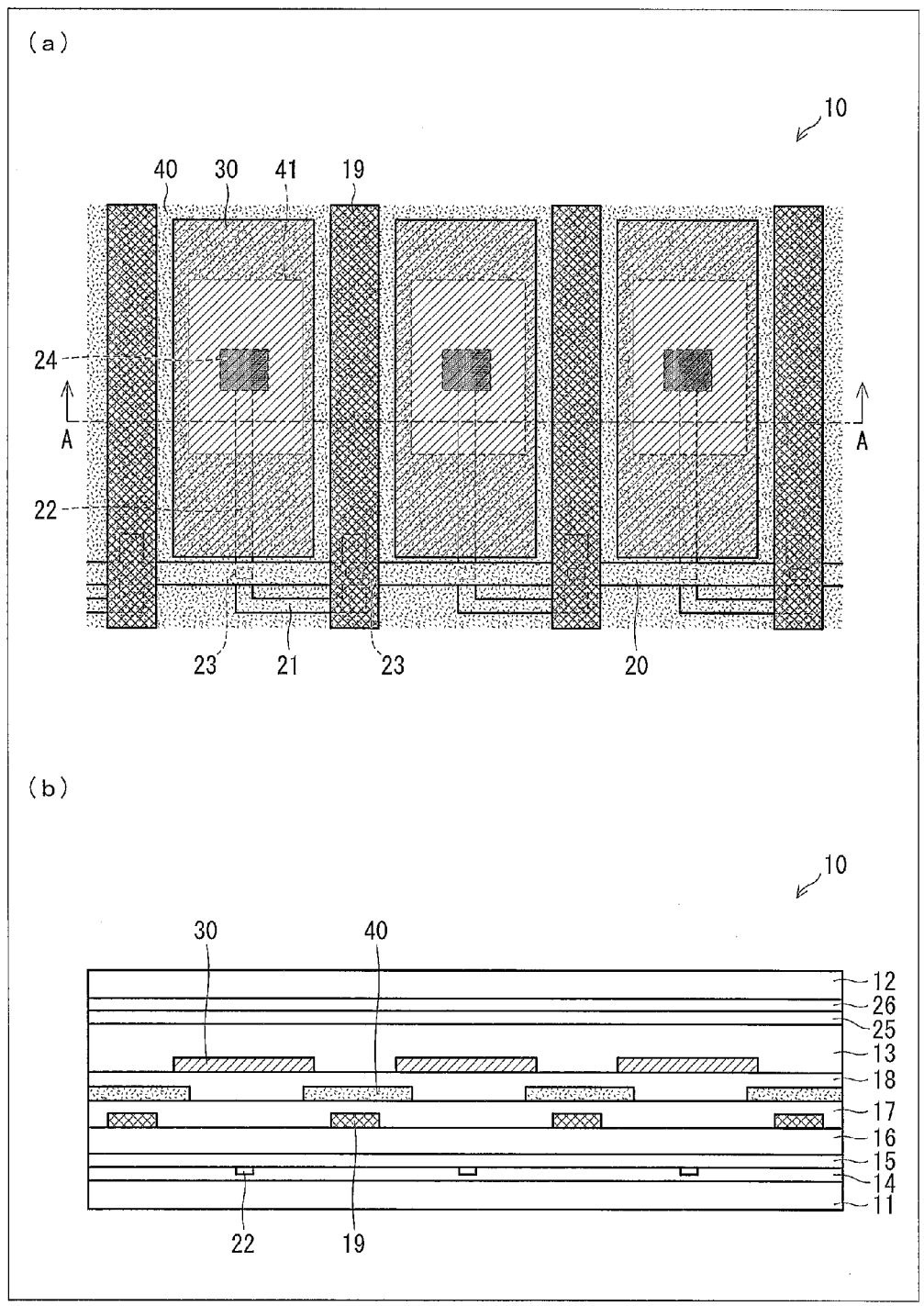
Figure 2:
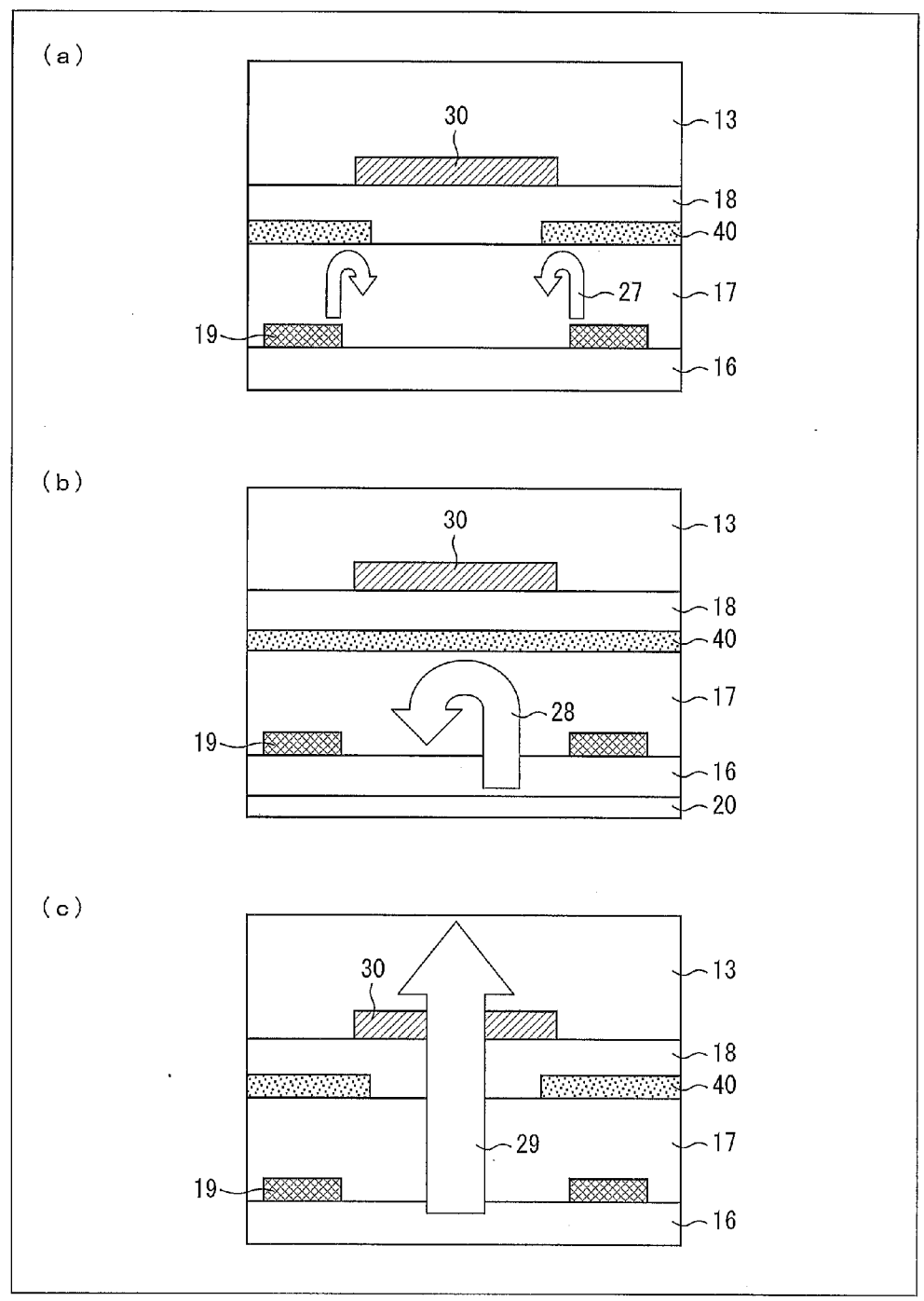

A liquid crystal display element 10 of Embodiment 1 of the present invention will be described below with reference to FIGS. 1 and 2. (a) of FIG. 1 is a plan view schematically illustrating the liquid crystal display element 10. (b) of FIG. 1 is a cross-sectional view schematically illustrating a cross section taken along Line A-A illustrated in (a) of FIG. 1. (a) of FIG. 2 is an enlarged view illustrating part of the cross-sectional view illustrated in (b) of FIG. 1. (b) of FIG. 2 is an enlarged view illustrating a cross section taken along a scan line 20 which is parallel to the Line A-A illustrated in (a) of FIG. 1. Similar to (a) of FIG. 2, (c) of FIG. 2 is an enlarged view illustrating (i) the part of the cross-sectional view illustrated in (b) of FIG. 1 and (ii) a state where backlight 29 enters a liquid crystal layer 13.

The liquid crystal display element 10 is one of vertical electric field type liquid crystal display elements, i.e., a VA mode liquid crystal display element. The liquid crystal display element 10 employs dot reversal driving as a driving method. As illustrated in (b) of FIG. 1, the liquid crystal display element 10 includes (i) a glass substrate 11 (one of a pair of transparent substrates), (ii) a glass substrate 12 (the other of the pair of transparent substrates), and (iii) a liquid crystal layer 13 which is sandwiched between the glass substrate 11 and the glass substrate 12. The glass substrate 11 has (i) a first surface on which a polarizing plate (not illustrated) is provided so as to be in contact with the first surface, and (ii) a second surface facing the liquid crystal layer 13, the first surface and the second surface of the glass substrate 11 being opposite to each other. Similarly, the glass substrate 12 has (i) a first surface on which a polarizing plate (not illustrated) is provided so as to be in contact with the first surface, and (ii) a second surface facing the liquid crystal layer 13, the first surface and the second surface of the glass substrate 12 being opposite to each other. The liquid crystal display element 10 is provided with a backlight (not illustrated) which irradiates, with white light, the polarizing plate which is provided on the first surface of the glass substrate 11.

A color filter 26 and a counter electrode 25 are stacked on the second surface of the glass substrate 12. The color filter 26 selectively transmits any one of beams of light of white backlight that has passed through the liquid crystal layer 13, the beams of light having wavelengths which fall within red, green and blue wavelength ranges, respectively. The color filter 26 is constituted by red color filters, green color filters, and blue color filters, which are arranged in a matrix manner (not illustrated in (b) of FIG. 1). It is preferable that the color filter 26 includes a black matrix in addition to the red color filters, the green color filters, and the blue color filters.

The liquid crystal display element 10 is characterized in (i) a shape of a common electrode 40 (transparent common electrode) with which the glass substrate 11 is provided and (ii) a location where the common electrode 40 is provided. The following description will discuss in detail members which are stacked on the second surface of the glass substrate 11. A configuration which is known as being of the VA mode liquid crystal display element is applicable to the glass substrate 12 and the liquid crystal layer 13.

(Configuration of Glass Substrate 11)

On the second surface of the glass substrate 11 sequentially stacked are a base coat (BC) 14, a plurality of SI electrically-conductive paths 21, a plurality of SI electrically-conductive paths 22, a first insulating film 15, a plurality of scan lines 20, a second insulating film 16, a plurality of signal lines 19, a JAS film 17, a common electrode 40, a third insulating film 18, and a plurality of pixel electrodes 30 (transparent pixel electrode).

The plurality of signal lines 19 are provided at regular intervals so as to be parallel to each other (later described in detail). Similarly, the plurality of scan lines 20 are provided at regular intervals so as to be parallel to each other. The plurality of signal lines 19 are orthogonal to the plurality of scan lines 20, when viewed from above. Rectangular regions, which are defined by the plurality of signal lines 19 and the plurality of scan lines 20, correspond to respective sub-pixels.

Since (b) of FIG. 1 is the cross-sectional view taken along Line A-A, (b) of FIG. 1 illustrates no scan line 20. The plurality of scan lines 20 are provided in a layer where the first insulating layer 15 is provided. (b) of FIG. 1 illustrates no SI electrically-conductive path 21, either. The plurality of SI electrically-conductive paths 21 and the plurality of SI electrically-conductive paths 22 are provided in the same layer.

(TFT)

A plurality of TFTs, each of which serves as a driving element of the liquid crystal display element 10, are provided such that (i) two TFTs are provided for each sub-pixel region and (ii) each TFT is provided with gate electrodes 23, a corresponding one of the plurality of SI electrically-conductive paths 21, a corresponding one of the plurality of SI electrically-conductive paths 22, a drain electrode 24, and a source electrode (not illustrated). The SI electrically-conductive path 21 of the TFT is connected via a contact hole (not illustrated) to the source electrode of the TFT and a signal line 19 corresponding to the TFT. The SI electrically-conductive path 22 of the TFT has an end which is connected to the drain electrode 24 of the TFT. The drain electrode 24 of the TFT is connected via a contact hole (not illustrated) to a pixel electrode 30 corresponding to the TFT.

First, the BC 14, the plurality of SI electrically-conductive paths 21, and the plurality of SI electrically-conductive paths 22 are provided on the second surface of the glass substrate 11. The plurality of SI electrically-conductive paths 21 and the plurality of SI electrically-conductive paths 22 are made of silicon. The BC 14 is made of, for example, $Ta_2O_5$. The BC 14 serves as a protection film which protects the second surface of the glass substrate 11. The BC 14 also serves as an etching stopper when the plurality of SI electrically-conductive paths 21 and the plurality of SI electrically-conductive paths 22 are patterned.

The gate electrodes 23 of the TFT are part of the scan line 20 corresponding to the TFT. A gate insulating layer and a channel layer (which are not illustrated in (a) of FIG. 1) are provided at an interface between (i) the gate electrodes 23 of the TFT and (ii) the SI electrically-conductive path 21 and the SI electrically-conductive path 22 of the TFT.

(Scan Line 20)

The plurality of scan lines 20 and the first insulating film 15 are provided on the plurality of SI electrically-conductive paths 21, the plurality of SI electrically-conductive paths 22, and the BC 14. The plurality of scan lines 20 are provided at regular intervals so as to be parallel to each other. The plurality of scan lines 20 are orthogonal to the plurality of SI electrically-conductive paths 22.

Each of the plurality of TFTs is provided in the vicinity of an intersection part where a corresponding one of the plurality of scan lines 20 intersects a corresponding one of the plurality of signal lines 19.

It is preferable that the plurality of scan lines 20 have a high electrical conductivity and are made of a metal material. Examples of the metal material for the plurality of scan lines 20 include aluminum, molybdenum, chromium, tungsten, and titanium. It is possible to form the plurality of scan lines 20 which have such a high electrical conductivity, by stacking layers of respective metals which are selected from the group of these metal materials. The plurality of scan lines 20 can alternatively be formed from an electrically-conductive compound.

The first insulating film 15 is provided between the plurality of scan lines 20. The first insulating film 15 is made of $SiN_x$ or $SiO_2$. The first insulating film 15 should transmit backlight which has entered the liquid crystal display element 10. The first insulating film 15 preferably has a low visible light absorption efficiency so that luminance of the liquid crystal display element 10 is not sacrificed.

The second insulating film 16 is provided on the first insulating film 15. The second insulating film 16 serves as an interlayer insulating film which electrically insulates the plurality of scan lines 20 from the plurality of signal lines 19 to be later described. Similar to the first insulating film 15, the second insulating film 16 is made of $SiN_x$ or $SiO_2$ and preferably has a low visible light absorption efficiency.

(Signal Line 19)

The plurality of signal lines 19 are provided on the second insulating film 16. The plurality of signal lines 19 are provided at regular intervals so as to be parallel to each other. The plurality of signal lines 19 are orthogonal to the plurality of scan lines 20 (see (a) of FIG. 1). Therefore, rectangular regions, which are defined by the plurality of signal lines 19 and the plurality of scan lines 20, are arranged in a matrix manner on the glass substrate 11. The rectangular regions correspond to the respective sub-pixels. Three sub-pixels (a red sub-pixel, a green sub-pixel, and a blue sub-pixel) constitute one (1) pixel.

As has been described, two TFTs are provided for each sub-pixel. The SI electrically-conductive path 21 of the TFT is electrically connected to the corresponding one of the plurality of signal lines 19 via the source electrode (not illustrated) and a contact hole (not illustrated). The contact hole penetrates the first insulating film 15 and the second insulating film 16.

Similar to the plurality of scan lines 20, it is preferable that the plurality of signal lines 19 have a high electrical conductivity and are made of a metal material. Examples of the metal material for the plurality of signal lines 19 include aluminum, molybdenum, chromium, tungsten, and titanium. It is possible to form the plurality of signal lines 19 which have such a high electrical conductivity, by stacking layers of respective metals which are selected from the group of these metal materials. The plurality of signal lines 19 can alternatively be formed from an electrically-conductive compound.

The JAS film 17, which is a transparent organic insulating film, is provided on the plurality of signal lines 19. The JAS film 17 serves as an interlayer insulating film which electrically insulates the plurality of signal lines 19 from the common electrode 40 which is to be later described. The JAS film 17 preferably has a thickness larger than those of the first insulating film 15, the second insulating film 16 and the third insulating film 18. By forming the JAS film 17 so as to be thicker as such, it is possible to flatten a surface which is made uneven by providing the plurality of signal lines 19, the plurality of scan lines 20, and like members. The JAS film 17 is characterized in being easily made flat and thick, as compared to the other insulating films made of $SiN_x$ or $SiO_2$.

Note that a region where the pixels are arranged in a matrix manner on the second surface of the glass substrate 11 is hereinafter referred to as a pixel forming region.

(Common Electrode 40)

The common electrode 40 is provided on the JAS film 17. As illustrated in (a) of FIG. 1, the common electrode 40 has opening parts 41 for the respective sub-pixels. Each region where an opening part 41 is provided includes a region where a corresponding drain electrode 24 and a contact hole (not illustrated) are provided, via the corresponding drain electrode 24 and the contact hole a corresponding one of the plurality of SI electrically-conductive paths 21 being electrically connected to a corresponding one of the plurality of pixel electrodes 30. In other words, the common electrode 40 has the opening parts 41 in respective regions in each of which at least the contact hole is provided.

Thanks to the opening parts 41 provided in the respective regions, the common electrode 40 can be electrically insulated from the plurality of SI electrically-conductive paths 22, drain electrodes 24, and the plurality of pixel electrodes 30. Such electrical insulation is required so that no leakage is caused between (i) the common electrode 40 and (ii) the plurality of SI electrically-conductive paths 22, the drain electrodes 24, and the plurality of pixel electrodes 30 due to difference in electric potential between (i) the common electrode 40 and (ii) the plurality of SI electrically-conductive paths 22, the drain electrodes 24, and the plurality of pixel electrodes 30.

Note that a shape of each of the opening parts 41 and the number of the opening parts 41 are not limited, provided that the common electrode 40 is electrically insulated from the plurality of SI electrically-conductive paths 22, the drain electrodes 24, and the plurality of pixel electrodes 30. Note, however, that, in a case where a plurality of opening parts 41 are provided for each of the sub-pixels in the common electrode 40, storage capacitance will probably varies from one sub-pixel from another sub-pixel. Such variation in storage capacitance would be recognized by a user as display unevenness. It is therefore preferable that the opening parts 41 of the common electrode 40 are provided for the respective sub-pixels on one-to-one basis.

The common electrode 40 is provided so that each of the sub-pixels has storage capacitance. The storage capacitance is required to hold an electric field applied across the liquid crystal layer 13 in the sub-pixels during a period in which a signal line 19 corresponding to the sub-pixels is receiving no address signal.

The common electrode 40 extends over the whole pixel forming region other than the opening parts 41. That is, the liquid crystal display device 10 includes one (1) common electrode 40, and the common electrode 40 has a uniform electric potential for all of the sub-pixels.

The common electrode 40 is made of one of indium tin oxide (ITO) and indium zinc oxide (IZO), which are a transparent electrically-conductive material. Since the common electrode 40 extends over the whole pixel forming region other than the opening parts 41, the common electrode 40 preferably has a satisfactory visible light transmittance. Moreover, the common electrode 40 preferably has a satisfactory electrical conductivity. The common electrode 40 can also be made of a transparent electrically-conductive material, other than ITO and IZO, which has such satisfactory visible light transmittance and electrical conductivity.

The liquid crystal display element 10 is characterized in the common electrode 40. An effect, which is brought about by the liquid crystal display element 10 including the common electrode 40, will be later described.

The third insulating film 18 is provided on the common electrode 40. The third insulating film 18 serves as an interlayer insulating film which electrically insulates the common electrode 40 from the plurality of pixel electrodes 30. Similar to the first insulating film 15 and the second insulating film 16, the third insulating film 18 is made of $SiN_x$ or $SiO_2$ and preferably has a low visible light absorption efficiency.

(Pixel Electrode 30)

The plurality of pixel electrodes 30 are provided on the third insulating film 18. The plurality of pixel electrodes 30 are provided in such a manner that one pixel electrode 30 is provided for one sub-pixel. That is, the plurality of pixel electrodes 30 are arranged in a matrix manner in the pixel forming region.

Each of the plurality of pixel electrodes 30 is electrically connected, via a corresponding one of the drain electrodes 24 and a contact hole, to a corresponding one of the plurality of SI electrically-conductive paths 22 with a corresponding one of the plurality of TFTs is provided. It is preferable that the corresponding one of the drain electrodes 24 and the contact hole are provided in a center part of a corresponding one of sub-pixel regions which are defined by the plurality of signal lines 19 and the plurality of scan lines 20 (see (a) of FIG. 1). The reason for this concerns the fact that a region where the corresponding one of the drain electrodes 24 and the contact hole are provided does not transmit light.

Though detailed description is omitted, the VA mode liquid crystal display element 10 is preferably configured such that the counter electrode 25 has holes at locations which correspond to centers of the sub-pixel regions, respectively. The holes bring about an effect of restricting orientation of liquid crystal. Therefore, the orientation of liquid crystal can be improved. On the other hand, light transmittance is reduced in regions where the holes are provided. However, it is possible to suppress loss of light which passes through the liquid crystal display element 10, by causing each of the holes of the counter electrode 25 to align with the corresponding one of the drain electrodes 24 and the contact hole. That is, by doing so, it is possible to improve the luminance of the liquid crystal display element 10.

The counter electrode 25 can alternatively have the holes at locations other than the locations which correspond to the centers of the sub-pixel regions, respectively. The number of the holes of the counter electrode 25 can be two or more for each of the sub-pixel regions. Each of the holes has any shape, for example, an oval shape. In these cases, it is preferable that the corresponding one of the drain electrodes 24 and the contact hole are not provided in the center part of the corresponding one of the sub-pixel regions, but are provided at a location which corresponds to a location where such a corresponding hole (corresponding holes) is(are) provided.

In order to restrict the orientation of liquid crystal, the counter electrode 25 can have protrusions instead of the holes. In this case, it is preferable that each of the protrusions is located so as to correspond to a location where the corresponding one of the drain electrodes 24 and the contact hole are provided.

It is preferable that, in a case of a TN mode liquid crystal display element, the corresponding one of the drain electrodes 24 and the contact hole are provided in the vicinity of a peripheral part of the corresponding one of the sub-pixel regions. This makes it possible to reduce an influence on the orientation of liquid crystal.

The contact hole penetrates the first insulating film 15, the second insulating film 16, the JAS film 17, and the third insulating film 18. This allows the corresponding one of the drain electrodes 24 to be electrically connected to the corresponding one of the plurality of pixel electrodes 30.

The plurality of pixel electrodes 30 are made of ITO or IZO. The plurality of pixel electrodes 30 are provided in a region of the liquid crystal display element 10, which region transmits light. It is therefore preferable that the plurality of pixel electrodes 30 have a satisfactory visible light transmittance. Moreover, the plurality of pixel electrodes 30 preferably have a satisfactory electrical conductivity. The plurality of pixel electrodes 30 can also be made of a transparent electrically-conductive material, other than ITO and IZO, which has such satisfactory visible light transmittance and electrical conductivity.

An alignment film (not illustrated), which improves the orientation of liquid crystal, is provided on the plurality of pixel electrodes 30 and the third insulating film 18 on which the plurality of pixel electrodes 30 are provided.

(Effect of Common Electrode 40)

The effect, which is brought about by the liquid crystal display element 10 including the common electrode 40, includes (i) an effect of suppressing parasitic capacitance, (ii) an effect of maintaining appropriate storage capacitance, and (iii) an effect of improving the luminance of the liquid crystal display element. The following description will discuss these effects.

(Suppression of Parasitic Capacitance)

When the liquid crystal display element 10 is cross-sectionally viewed, the common electrode 40 is provided (i) between the plurality of signal lines 19 and the plurality of pixel electrodes 30 and (ii) between the plurality of scan lines 20 and the plurality of pixel electrodes 30 (see (b) of FIG. 1). On the other hand, when the liquid crystal display element 10 is viewed from above, the common electrode 40 extends over the whole pixel forming region other than the opening parts 41 (see (a) of FIG. 1).

Therefore, the common electrode 40 shields the plurality of signal lines 19 from the plurality of pixel electrodes 30 (see (a) of FIG. 2) in the cross section taken along Line A-A illustrated in (a) of FIG. 1. This can suppress parasitic capacitance Csd 27 which is formed by the plurality of signal lines 19 and the plurality of pixel electrodes 30. The common electrode 40 also shields the plurality of scan lines 20 from the plurality of pixel electrodes 30 (see (b) of FIG. 2) in the cross section taken along the scan line 20 which is parallel to the Line A-A illustrated in (a) of FIG. 1. This can suppress parasitic capacitance Cgd 28 which is formed by the plurality of scan lines 20 and the plurality of pixel electrodes 30.

As such, the liquid crystal display element 10 including the common electrode 40 can suppress the parasitic capacitances Csd 27 and Cgd 28. Therefore, the liquid crystal display element 10 can suppress deterioration in display quality due to the parasitic capacitances Csd 27 and Cgd 28. That is, the common electrode 40 brings about an effect of improving the display quality of the liquid crystal display element 10.

(Maintaining of Storage Capacitance)

Storage capacitance Ccs is formed by the common electrode 40 and the plurality of pixel electrodes 30 in the liquid crystal display element 10. The common electrode 40 overlaps the plurality of pixel electrodes 30 in a broad region other than the opening parts 41. It is therefore easy to form sufficiently large storage capacitance Ccs in the liquid crystal display element 10. Note that the JAS film 17, which is thick, is provided between the common electrode 40 and the plurality of SI electrically-conductive paths. Therefore, capacitance which is formed by the common electrode 40 and the plurality of SI electrically-conductive paths is remarkably small.

In order that the liquid crystal display element 10 attains a satisfactory display quality, the storage capacitance Ccs should fall within a preferable range. It is possible to change the storage capacitance Ccs by changing the size of each of the opening parts 41 of the common electrode 40. Specifically, as the size of each of the opening parts 41 is increased, the common electrode 40 overlaps the plurality of pixel electrodes 30 in a smaller area. This causes the storage capacitance Ccs to be decreased. In contrast, as the size of each of the opening parts 41 is decreased, the common electrode 40 overlaps the plurality of pixel electrodes 30 in a larger area. This causes the storage capacitance Ccs to be increased.

Assume that liquid crystal capacitance Cpix is formed by the plurality of pixel electrodes 30 and the counter electrode 25. In this case, a relationship between the liquid crystal capacitance Cpix and the storage capacitance Ccs preferably satisfies $0.6 \times Cpix \leq Ccs \leq 0.95 \times Cpix$.

In a case where $0.6 \times Cpix \leq Ccs$ is satisfied, the liquid crystal display element 10 can have the storage capacitance Ccs large enough for the liquid crystal display element 10 to attain the satisfactory display quality. In other words, even while none of the plurality of scan lines 20 is receiving any address signal, an electric field can be stably held. This can suppress occurrence of flicker. This ultimately allows the liquid crystal display element 10 to attain the satisfactory display quality.

In order that $0.6 \times Cpix \leq Ccs$ is satisfied, a surface area of the common electrode 40, which is viewed from above, should be larger than a predetermined surface area which satisfies $Ccs = 0.6 \times Cpix$. What is meant by increase in surface area of the common electrode 40 is decrease in surface area of the opening parts 41. Such decrease in surface area of the opening parts 41 causes a reduction in electric resistance at opposite ends of the common electrode 40. This can suppress occurrence of crosstalk between the sub-pixels. This ultimately allows the liquid crystal display element 10 to attain the satisfactory display quality.

In a case where $Ccs \leq 0.95 \times Cpix$ is satisfied, the storage capacitance can be sufficiently charged during a period in which an address signal is being supplied to the scan line 20 associated with the storage capacitance. This allows an electric field for controlling the liquid crystal layer 13 to be sufficiently held even during a period in which the scan line 20 associated with the electric field is receiving no address signal.

Assume that the size of each of the opening parts 41 should be increased so that the storage capacitance Ccs falls within the preferable range. In this case, the surface area of the common electrode 40 is reduced. This will cause an increase in electric resistance at the opposite ends of the common electrode 40. However, such an increase in electric resistance can be prevented by increasing a thickness of the common electrode 40.

(Improvement of Luminance)

The common electrode 40 included in the liquid crystal display element 10 is made of the transparent electrically-conductive material, i.e., ITO or IZO. The common electrode 40 has the opening parts 41. When the glass substrate 11 is viewed from above, at least part of each of the opening parts 41 overlaps a corresponding one of the plurality of pixel electrodes 30.

Thanks to the opening parts 41 of the common electrode 40, backlight 29 which has entered the liquid crystal display device 10 is not absorbed by the common electrode 40 but enters the liquid crystal 13 (see the cross-sectional view illustrated in (c) of FIG. 2).

Even in a case where the backlight 29, which has entered the liquid crystal display element 10, enters the liquid crystal layer 13 after passing through the common electrode 40, the luminance of the liquid crystal display element 10 is not remarkably reduced. This is because the common electrode 40 has a satisfactory light transmittance.

Since the liquid crystal display device 10 includes the common electrode 40 which (i) is made of the transparent electrically-conductive material and (ii) has the opening parts 41, the liquid crystal display device 10 does not sacrifice the luminance, unlike a conventional liquid crystal display element which includes a common electrode made of a metal material.

Note that each of the opening parts 41 is allowed to be partially provided in a region other than a region where the corresponding one of the plurality of pixel electrodes 30 is provided. Note, however, that the at least part of each of the opening parts 41 is preferably provided in a region where the contact hole 24 and the corresponding one of the plurality of pixel electrodes 30 are provided.

As such, the vertical electric field type liquid crystal display device 10, which includes the common electrode 40, (i) can have the storage capacitance large enough for the vertical electric field type liquid crystal display element 10 to attain the satisfactory display quality, and (ii) can, without sacrificing the luminance, suppress (a) the parasitic capacitance which is formed by the plurality of scan lines and the plurality of pixel electrodes and (b) the parasitic capacitance which is formed by the plurality of signal lines and the plurality of pixel electrodes. This ultimately allows the vertical electric field type liquid crystal display element 10 to improve the display quality.

Note that the liquid crystal display element 10 is not limited to the VA mode liquid crystal display element, and can therefore be any vertical electric field type liquid crystal display elements. The present invention is applicable to any one of the vertical electric field type liquid crystal display elements.

A liquid crystal display device of Embodiment 1 of the present invention can be configured to include the liquid crystal display element 10. With the configuration, the liquid crystal display device can improve display quality of the liquid crystal display device without sacrificing a luminance of the liquid crystal display device.

Embodiment 2

Liquid Crystal Display Element 50

Figure 3:
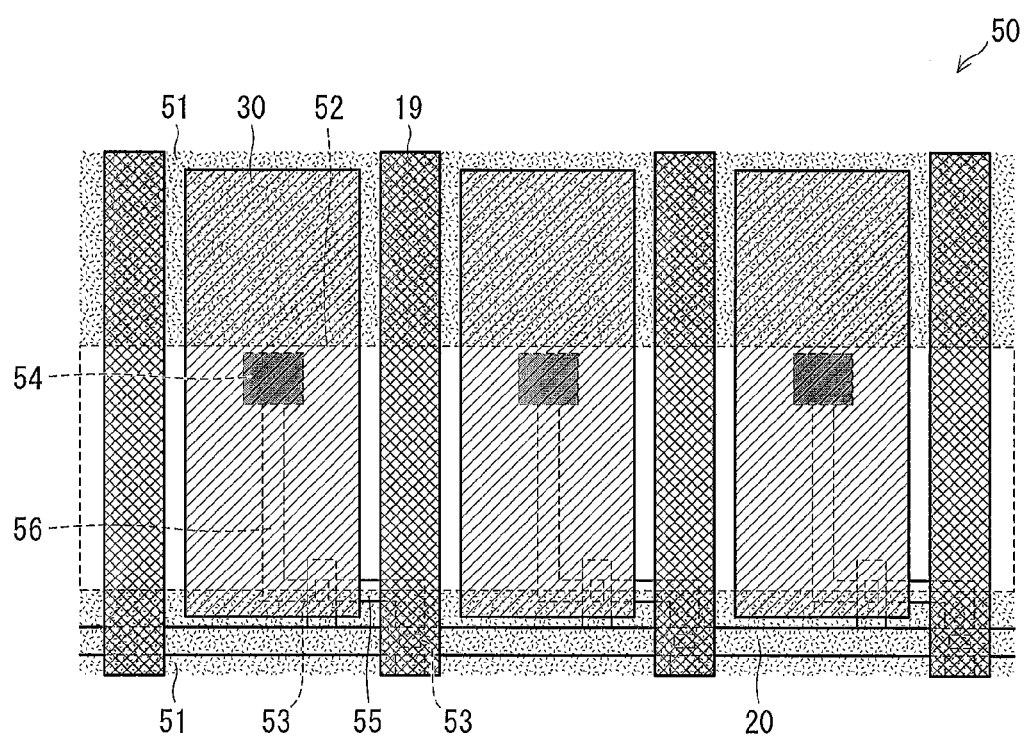
FIG. 3 is a plan view schematically illustrating a liquid crystal display element of another embodiment of the present invention.

The following description will discuss a liquid crystal display element 50 of Embodiment 2 of the present invention with reference to FIG. 3. FIG. 3 is a plan view schematically illustrating the liquid crystal display element 50. A common electrode 51 and a TFT 53 of the liquid crystal display element 50 are different in shape from those of the liquid crystal display element 10. Therefore, Embodiment 2 will describe merely the common electrode 51 and the TFT 53. Note that identical reference numerals are given to members identical to those included in the liquid crystal display device 10, and descriptions of such members are omitted in Embodiment 2.

(Common Electrode 51)

The liquid crystal display element 50 is a VA mode liquid crystal display element, as with the liquid crystal display element 10. However, they are different in that the liquid crystal display element 10 is driven by dot reversal driving, whereas the liquid crystal display element 50 is driven by scan line reversal driving. Due to such a difference in driving method, the shape of the common electrode 51 included in the liquid crystal display device is different from that of the common electrode 40 included in the liquid crystal display device 10.

Each common electrode 51 is provided for a plurality of sub-pixels which are provided for each scan line 20. Therefore, the liquid crystal display element 50 is configured so that rows, in each of which the plurality of sub-pixels are arranged, are independent from each other. This causes common electrodes 51 to be electrically insulated from each other.

The common electrodes 51 are connected to a CS driver for controlling storage capacitance. The CS driver supplies an appropriate signal to the common electrodes 51 so that each of the plurality of sub-pixels which are provided for the each scan line 20 can have appropriate storage capacitance.

When viewed from above, each of the common electrodes 51 has such a shape that covers the whole corresponding one of scan lines 20 and partially covers signal lines 19. The shape of each of the common electrodes 51 of Embodiment 2 is rectangular. However, the shape of each of the common electrodes 51 is not limited to such a rectangular shape, provided that the above configuration is satisfied.

Thanks to the common electrodes 51 each having the above-described shape, it is possible to suppress (i) parasitic capacitance Cgd which is formed by the scan lines 20 and pixel electrodes 30 and (ii) some of parasitic capacitance Csd which is formed by the signal lines 19 and the pixel electrodes 30.

As such, even the liquid crystal display element 50 of a vertical electric field type, which is driven by scan line reversal driving, can reduce an influence of the parasitic capacitances on display quality of the liquid crystal display element 50. That is, the liquid crystal display element 50 can improve the display quality.

(TFT)

TFTs included in the liquid crystal display element 50 are a top gate TFT. Two TFTs are provided for each sub-pixel region in the vicinity of an intersection part where a corresponding one of the scan lines 20 intersects a corresponding one of the signal lines 19. The two TFTs are provided with gate electrodes 53, a drain electrode 54, an SI electrically-conductive path 55, and an SI electrically-conductive path 56. The TFTs included in the liquid crystal display element 50 are different from those included in the liquid crystal display element 10 in the shape of an SI electrically-conductive path and the shape of a gate electrode.

An electrically-conductive film, of which one of the gate electrodes 53 is made, extends from the corresponding one of the scan lines 20 so as to be perpendicular to a direction in which the corresponding one of the scan lines 20 extends (see FIG. 3). The electrically-conductive film is made of a material identical to that of which the scan lines 20 are made.

The other of the gate electrodes 53 is provided at an intersection part where the SI electrically-conductive path 55 intersects the corresponding one of the scan lines 20. The SI electrically-conductive path 55 connects the one of the gate electrodes 53 to the other of the gate electrodes 53. The SI electrically-conductive path 55 has a part which is connected to the corresponding one of the signal lines 19 which also serves as a source electrode, the part extending from the intersection part. The SI electrically-conductive path 56 connects the drain electrode 54 to one of the two TFTs.

A gate insulating film and a channel layer are provided at an interface between the gate electrodes 53 and the SI electrically-conductive paths 55 and 56. The SI electrically-conductive paths 55 and 56 are made of silicon.

Embodiment 3

Figure 4:
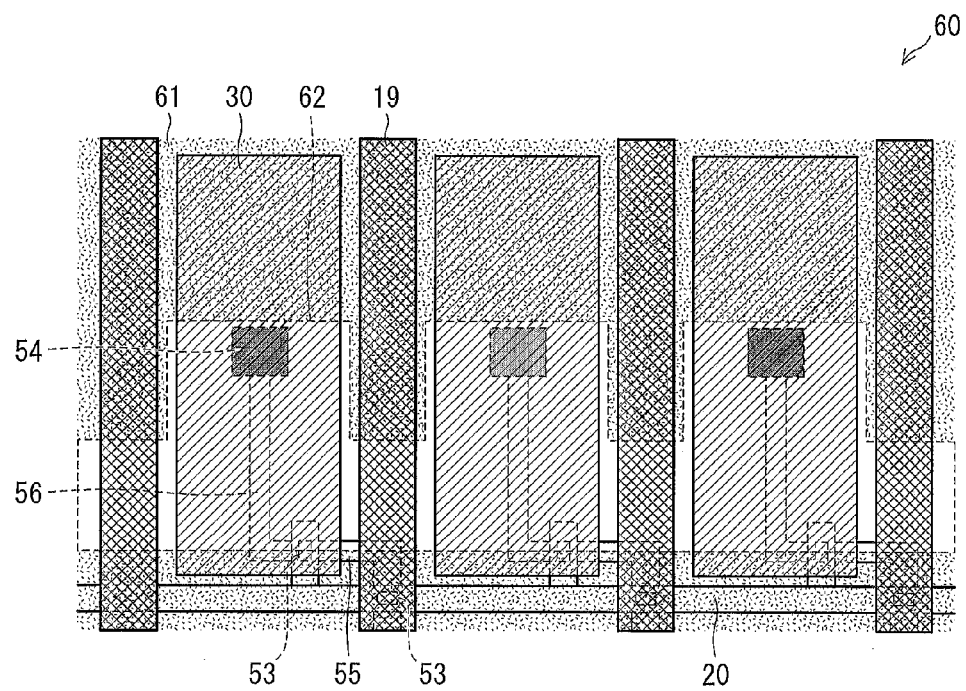
FIG. 4 is a plan view schematically illustrating a liquid crystal display element of yet another embodiment of the present invention.

The following description will discuss a liquid crystal display element 60 of Embodiment 3 of the present invention with reference to FIG. 4. A common electrode 61 included in the liquid crystal display device 60 is different in the shape of an opening part from the common electrode 51 included in the liquid crystal display device 50. The shape of the common electrode 51 is rectangular. Therefore, in a case where the common electrode 51 has a width along a direction parallel to a signal line, the width is always uniform.

In contrast, a width of the common electrode 61 is not uniform. The width of the common electrode 61 is larger in a first region where a signal line 19 is provided and in a peripheral region thereof than in a second region other than the first region and the peripheral region.

With the configuration, the common electrode 61 can cover the first region more broadly than the common electrode 51. Therefore, the liquid crystal display element can suppress parasitic capacitance Csd, which is formed by signal lines 19 and pixel electrodes 30, more effectively than the liquid crystal display element 50. That is, the liquid crystal display element 60 can improve display quality more than the liquid crystal display element 50.

(Additional Description)

In order to attain the object, a liquid crystal display element of an aspect of the present invention is configured to include: a pair of transparent substrates; and a liquid crystal layer which is provided between the pair of transparent substrates, one of the pair of transparent substrates being provided with: scan lines; signal lines which are orthogonal to the scan lines; driving elements each of which is connected to a corresponding one of the signal lines and a corresponding one of the scan lines; transparent pixel electrodes which are connected to the respective driving elements and are provided in an upper layer that is upper than the scan lines and the signal lines; and a transparent common electrode or transparent common electrodes which is(are) provided in a layer between (i) the scan lines and the signal lines and (ii) the transparent pixel electrodes so as to cover a location which faces at least one of (i) at least part of the scan lines and (ii) at least part of the signal lines, the transparent common electrode having opening parts at locations which face the respective transparent pixel electrodes, the other of the pair of transparent substrates being provided with a counter electrode.

According to the configuration, the liquid crystal display element of the aspect of the present invention is configured so that the transparent common electrode or the transparent common electrodes is(are) provided in the layer between (i) the scan lines and the signal lines and (ii) the transparent pixel electrodes so as to cover at least one of (i) at least part of the scan lines and (ii) at least part of the signal lines. In a case where the liquid crystal display element is configured so that the transparent common electrode or the transparent common electrodes cover(s) the location which faces the at least part of the scan lines, the transparent common electrode or the transparent common electrodes shield(s) the at least part of the scan lines from the transparent pixel electrodes. On the other hand, in a case where the liquid crystal display element is configured so that the transparent common electrode or the transparent common electrodes cover(s) the location which faces the at least part of the signal lines, the transparent common electrode or the transparent common electrodes shield(s) the at least part of the signal lines from the transparent pixel electrodes. This makes it possible to suppress parasitic capacitance which is formed by the transparent pixel electrodes and the at least one of (i) the at least part of the scan lines and (ii) the at least part of the signal lines.

The transparent common electrode has the opening parts at the locations which face the respective transparent pixel electrodes. This causes an increase in light which, without passing through the transparent common electrode, enters the liquid crystal layer. Consequently, a luminance of the liquid crystal display element is improved.

As such, according to the liquid crystal display element of the aspect of the present invention, it is possible to provide a vertical electric field type liquid crystal display element which, without sacrificing a luminance of the vertical electric field type liquid crystal display element, suppresses (i) parasitic capacitance which is formed by scan lines and pixel electrodes and (ii) parasitic capacitance which is formed by signal lines and the pixel electrodes.

It is preferable to configure the liquid crystal display element of the aspect of the present invention so that the transparent common electrode covers (i) locations which face all of the scan lines and (ii) locations which face all of the signal lines.

According to the configuration, the transparent common electrode shields all of the scan lines from the transparent pixel electrodes. The transparent common electrode also shields all of the signal lines from the transparent pixel electrodes. This allows the liquid crystal display element to more effectively suppress (i) parasitic capacitance which is formed by the scan lines and the transparent pixel electrodes and (ii) parasitic capacitance which is formed by the signal lines and the transparent pixel electrodes. Consequently, the liquid crystal display element of the aspect of the present invention can further improve display quality of the liquid crystal display element.

It is preferable to configure the liquid crystal display element of the aspect of the present invention so that the one of the pair of transparent substrates is provided with the scan lines, the transparent common electrodes are provided for the respective scan lines, and each of the transparent common electrodes covers at least a location which faces all of a corresponding one of the scan lines.

According to the configuration, the liquid crystal display element of the aspect of the present invention includes the transparent common electrodes for the respective scan lines. Each of the transparent common electrodes covers the location which faces all of the corresponding one of the scan lines. The transparent common electrodes are independently provided for the respective scan lines. In other words, the transparent common electrodes are electrically isolated from each other. This allows the transparent common electrodes to individually receive signals. As such, the liquid crystal display element of the aspect of the present invention employs scan line reversal driving as a driving method and can suppress a deterioration in display quality due to parasitic capacitance.

It is preferable to configure the liquid crystal display element of the aspect of the present invention so that each of the transparent common electrodes is wider at locations where the corresponding one of the scan lines intersects the signal lines than at locations where the corresponding one of the scan lines does not intersect the signal lines.

According to the configuration, each of the transparent common electrodes can cover the signal lines more broadly without narrowing the opening parts. This allows the liquid crystal display element of the aspect of the present invention to more effectively suppress parasitic capacitance which is formed by the signal lines and the transparent pixel electrodes, without sacrificing a luminance of the liquid crystal display element. That is, the liquid crystal display element can more effectively suppress a deterioration in display quality due to the parasitic capacitance.

It is preferable to configure a liquid crystal display device of an aspect of the present invention to include any one of the above-described liquid crystal display elements.

According to the configuration, a liquid crystal display device including a vertical electric field type liquid crystal display element can, without sacrificing a luminance of the liquid crystal display device, suppress (i) parasitic capacitance which is formed by scan lines and pixel electrodes and (ii) parasitic capacitance which is formed by signal lines and the pixel electrodes.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

The embodiments and specific examples of implementation discussed in the foregoing detailed explanation serve solely to illustrate the technical details of the present invention, which should not be narrowly interpreted within the limits of such embodiments and specific examples, but rather may be applied in many variations within the spirit of the present invention, provided that such variations do not exceed the scope of the patent claims set forth below.

INDUSTRIAL APPLICABILITY

The present invention is widely applicable to a liquid crystal display element and a liquid crystal display device.

REFERENCE SIGNS LIST

10: Liquid crystal display element
11: Glass substrate (one of a pair of transparent substrates)
12: Glass substrate (the other of the pair of transparent substrates)
13: Liquid crystal layer
14: Base coat
15: First insulating film
16: Second insulating film
17: JAS film
18: Third insulating film
19: Signal line
20: Scan line
21: SI electrically-conductive path
22: SI electrically-conductive path
23: Gate electrode
24: Drain electrode
25: Counter electrode 26: Color filter
27: Csd
28: Cgd
30: Pixel electrode (transparent pixel electrode)
40: Common electrode (transparent common electrode)
41: Opening part

The invention claimed is:

1. A liquid crystal display element, comprising:
a pair of transparent substrates; and
a liquid crystal layer which is provided between the pair of transparent substrates, wherein
one of the pair of transparent substrates is provided with:
  scan lines;
  signal lines which are orthogonal to the scan lines;
  driving elements each of which is connected to a corresponding one of the signal lines and a corresponding one of the scan lines;
  transparent pixel electrodes which are connected to the respective driving elements and are provided in an upper layer that is upper than the scan lines and the signal lines; and
  a transparent common electrode or transparent common electrodes which is(are) provided in a layer between (i) the scan lines and the signal lines and (ii) the transparent pixel electrodes so as to cover a location which faces at least one of (i) at least part of the scan lines and (ii) at least part of the signal lines, the transparent common electrode having opening parts at locations which face the respective transparent pixel electrodes,
Ccs corresponds to a storage capacitance provided by the transparent common electrode or the transparent common electrodes, and the transparent pixel electrodes,
Cpix corresponds to a liquid crystal capacitance provided by the transparent pixel electrodes and a counter electrode,
Ccs and Cpix satisfy $0.6 \times C_{pix} \leq C_{cs} \leq 0.95 \times C_{pix}$, and
the other of the pair of transparent substrates being provided with the counter electrode.

2. The liquid crystal display element as set forth in claim 1, wherein the transparent common electrode covers (i) locations which face all of the scan lines and (ii) locations which face all of the signal lines.

3. The liquid crystal display element as set forth in claim 1, wherein the one of the pair of transparent substrates is provided with the scan lines,
the transparent common electrodes are provided for the respective scan lines, and
each of the transparent common electrodes covers at least a location which faces all of a corresponding one of the scan lines.

4. The liquid crystal display element as set forth in claim 3, wherein each of the transparent common electrodes is wider at locations where the corresponding one of the scan lines intersects the signal lines than at locations where the corresponding one of the scan lines does not intersect the signal lines.

5. A liquid crystal display device, comprising a liquid crystal display element recited in claim 1.

* * * * *